United States Patent [19]

Smith et al.

[11] Patent Number: 4,967,347

[45] Date of Patent: Oct. 30, 1990

[54] MULTIPLE-REDUNDANT FAULT DETECTION SYSTEM AND RELATED METHOD FOR ITS USE

[75] Inventors: Steven E. Smith, Manhattan Beach; Kenneth J. Murphy, Canoga Park, both of Calif.

[73] Assignee: BH-F (Triplex) Inc., Torrance, Calif.

[21] Appl. No.: 847,956

[22] Filed: Apr. 3, 1986

[51] Int. Cl.$^5$ .................. G06F 1/00; G06F 11/16; G06F 7/02; G06F 7/20; G06F 15/16; H01R 13/64

[52] U.S. Cl. .................... 364/200; 364/266; 364/267.7; 364/269.1; 364/900; 364/945.4; 364/943.92; 364/944.2; 371/23; 371/3; 371/16.1

[58] Field of Search ............ 371/67, 68, 36, 3, 8, 371/9, 11, 16, 36, 71, 25, 16.1, 23; 364/184, 185, 186, 200 MS File, 900 MS File, 300

[56] References Cited

U.S. PATENT DOCUMENTS

| | | | |
|---|---|---|---|
| 3,735,356 | 5/1973 | Yates | 364/200 |
| 3,783,250 | 1/1974 | Fletcher et al. | 371/36 |
| 3,848,116 | 11/1974 | Möder et al. | 371/36 |
| 3,921,149 | 11/1975 | Kreis et al. | 371/36 |
| 3,993,935 | 11/1976 | Phillips et al. | 361/413 |
| 4,015,246 | 3/1977 | Hopkins, Jr. et al. | 371/36 |
| 4,079,440 | 3/1978 | Ohnuma et al. | 361/413 |
| 4,356,546 | 10/1982 | Whiteside et al. | 364/200 |
| 4,375,683 | 3/1983 | Wensley | 371/36 |
| 4,454,552 | 6/1984 | Barnes et al. | 361/9 |
| 4,562,575 | 12/1985 | Townsend | 371/36 |
| 4,570,261 | 2/1986 | Maher | 364/200 |
| 4,583,224 | 4/1986 | Ishii et al. | 371/36 |
| 4,593,396 | 6/1986 | Anderson, Jr. | 364/200 |
| 4,607,330 | 8/1986 | McMurray et al. | 364/200 |

*Primary Examiner*—Gareth D. Shaw
*Assistant Examiner*—John C. Loomis
*Attorney, Agent, or Firm*—Noel F. Heal

[57] ABSTRACT

A multiple-redundant computer system having multiple computational devices operating in synchronism, multiple voter circuits to provide voted memory reading operations for the devices, and multiple fault detection logic for the detection of failures of the computational devices. Fault status words generated by the fault detection logic are also subject to a voted read by the multiple computational devices, thereby permitting detection of errors in the fault detection logic itself, as well as in the computational devices. The module structure of the invention also permits removal and replacement of circuit modules, each including a computational device and fault detection logic, without disconnecting power from the entire system.

20 Claims, 6 Drawing Sheets

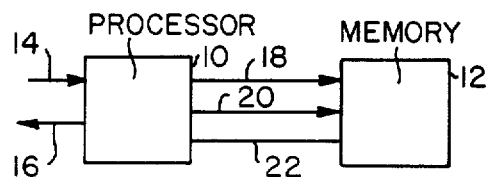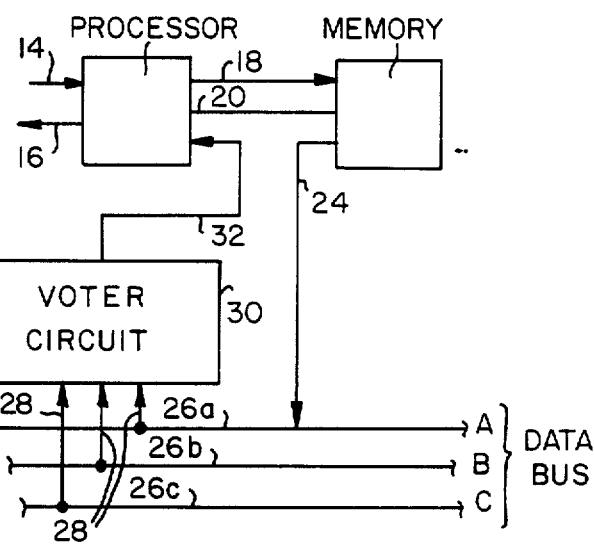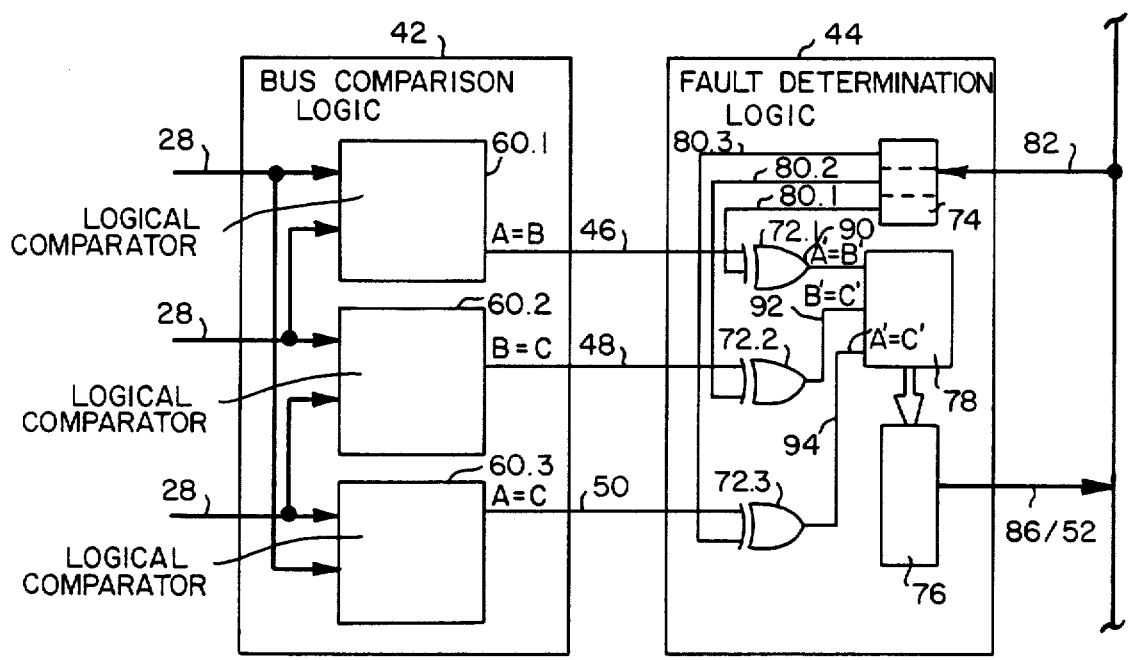

MULTIPLE-REDUNDANT FAULT DETECTION SYSTEM AND RELATED METHOD FOR ITS USE

BACKGROUND OF THE INVENTION

This invention relates generally to multiple-redundant processing systems and, more particularly, to multiple-redundant processors employing voting logic. Triple-modular-redundant (TMR) computational systems have been known for some years. For example, U.S. Pat. No. 4,375,683 to Wensley, entitled "Fault Tolerant Computational System and Voter Circuit," describes such a system based on TMR architecture. In general, the principle of TMR systems is that the computation functions are performed by three identical modules operating in synchronism, and the results of the computations they perform are compared in a "voter" circuit. If one module is in error for some reason, its results are outvoted by the correct results from the other two modules.

The TMR principle is also described in a paper by Wakerley, "Microcomputer Reliability Improvement Using Triple Modular Redundancy," Proc. of the IEEE, Vol. 64, No. 6, June 1976. Another useful background paper is by Davies and Wakerley, entitled "Synchronization and Matching in Redundant Systems," IEEE Trans. on Computers, Vol. C-27, No. 6, June 1978.

The following patents are indicative of the state of the art in the field of the invention:

| | | |
|---|---|---|
| 3,356,837 | Raymond | Binary Data Information Handling System |
| 3,501,743 | Dryden | Automatic Fault Correction System for Parallel Signal Channels |
| 3,538,498 | Games et al. | Majority Fault Selecting and Fault Indicating |
| 3,665,173 | Bouricius et al. | Triple Modular Redundancy/Sparing |
| 3,680,069 | Neumann et al. | Testing of Redundant Control Systems |
| 3,783,250 | Fletcher et al. | Adaptive Voting Computer System |
| 3,805,235 | Foster et al. | Equalization Means for Multi-Channel Redundant Control System |
| 3,848,116 | Moder et al. | Data Processing System having Triplexed System Units |
| 4,270,715 | Norton et al. | Railway Control Signal Interlocking Systems |
| 4,356,546 | Whiteside et al. | Fault-Tolerant Multi-Computer System |
| 4,402,045 | Krol | Multi-Processor Computer System |
| 4,497,059 | Smith | Multi-Channel Redundant Processing Systems |

The following patents are material to those aspects of the invention relating to removal and replacement of computation modules without disconnecting power from the entire system:

| | | |
|---|---|---|
| 3,993,935 | Phillips et al. | Printed Circuit Board Connection |
| 4,079,440 | Ohnuma et al. | Printed Circuit Board Capable of Being Inserted and Withdrawn on On-line Status |
| 4,454,552 | Barnes et al. | Printed Circuit Board Connection System |

A common drawback in many fault-tolerant systems of the prior art, such as the system described in the Wensley patent (U.S. Pat. No. 4,375,683), is that the detection of faults within the system depends on there being a correct output from a voter circuit. If the voter circuit itself fails, the fault detection logic also fails. Other systems have employed multiple voter circuits in various configurations, to address this problem. However, none of the systems of the prior art is completely satisfactory in the area of detection of failures within the fault detection logic itself.

Accordingly, there is still a need for a multiple-redundant majority-voting system capable of detecting faults not only in multiple computation modules, but also in fault determination logic associated with each of the modules. The present invention is directed to this end.

SUMMARY OF THE INVENTION

The present invention resides in a multiple-redundant computer system having multiple fault detection modules that are themselves subject to majority voting principles in the detection of faults. Briefly, and in general terms, the invention comprises a plurality of computational devices, each of which has a processor, a memory, and a data path between its processor and its memory, a data bus associated with each of the computational devices, means for intercepting data on the data path between the memory and the processor, and transmitting it to the corresponding data bus, and a voter circuit associated with each of the computational devices and connected to receive inputs from all of the data buses and to supply a single voted output to its computational device.

The system of the invention also includes fault determination logic associated with each of the computational devices, connected to receive inputs from all of the data buses and to generate a status word indicative of the fault status of the system, and means for connecting the fault determination logic with its corresponding data bus, in such a manner that each of the computational devices is supplied with a voted fault status word.

More specifically, in the illustrative embodiment of the invention the system is triple-redundant. The fault determination logic includes bus comparison logic connected to receive signals from the three data buses and to generate bus comparison output signals on three lines, indicative of the degree of agreement among the data buses. Specifically, the three output lines from the bus comparison logic indicate agreement or disagreement between each of the three possible pairings of data bus signals.

The fault determination logic also includes means for interpreting the bus comparison output signals from the bus comparison logic, and generating therefrom a fault status word. The fault determination logic also includes a test register addressable by the computational device, and coupled to the fault detection logic to allow selective setting of the bus comparison output signals, to facilitate the detection of faults within the fault determination logic.

The illustrative system of the invention is constructed to include three modules, each having a computational device, bus comparison logic and fault determination logic. Each module further includes electromechanical means permitting removal and replacement of the module without disconnection of power from the entire system. The electromechanical means includes an extended-length power connector pin to ensure connection of power before other connections during insertion of the module, and to ensure disconnection of power after disconnection of other lines during removal of the module, and further includes an electromechanical interlock for generating an electrical interrupt signal prior to actual removal of the module, whereby the interrupt signal may be employed to terminate operations of the module in an orderly manner.

In accordance with the method of the invention, errors in the fault determination logic of a triple-redundant computer system are detected by simulating an error condition in one of three synchronized computational subsystems, generating a resultant set of first fault status conditions in the fault determination logic associated with each of the three subsystems, reading the first fault status conditions onto three associated data buses and thence by majority vote into each of the three computational subsystems, and generating a second set of fault status conditions as a result of reading the first fault status conditions, the second fault status conditions providing the identity of any improperly operating fault determination logic.

In one variation of the method, the step of simulating a fault condition includes writing an intentionally incorrect data word onto a selected one of the data buses, whereby a voted read of the data buses should generate an indication of error in the computational subsystem associated with the selected bus, and the step of reading the first fault status conditions will reveal any improperly operating fault determination logic.

In another variation of the method the step of simulating a fault condition includes injecting a selected set of bus comparison signals into the fault determination logic, whereby the step of reading the first fault status conditions should produce the result expected from the bus comparison signals, and the step of reading the first fault status conditions generates second fault status conditions indicative of any errors in the fault determination logic itself.

In accordance with another aspect of the invention, power is supplied to the system from a plurality of independent power supplies, over a plurality of redundant power supply buses and an equal plurality of power sharing circuits. Each of a number of electrical loads in the system receives power from all of the power supplies, but the system is not subject to failure due to short circuits or other defects in the loads or in the power supplies. Each power sharing circuit includes a current limit circuit in each line from a power supply, to protect each supply from possible over-current conditions caused by a short circuit in the load. A diode is also included in each line from a power supply, to prevent any power supply from supplying current to a short circuit in another power supply. The outputs of the diodes are combined at one terminal of the load, to combine the currents derived from the separate power supplies.

It will be appreciated from the foregoing that the present invention represents a significant advance in the field of multiple-redundant majority-voting computer systems. Specifically, the invention provides a reliable technique for checking not just on the operation of multiple computation devices, but also on the operation of fault detection logic associated with each of the computation devices. Other aspects and advantages of the invention will become apparent from the following more detailed description, taken in conjunction with the accompanying drawings.

BRIEF DESCRIPTION OF THE DRAWINGS

FIG. 2a is a simplified block diagram of a computational device of the type with which the invention is employed;

FIG. 2b is a simplified block diagram similar to FIG. 2a, showing how a data path from memory is interrupted to provide connections with the triple-redundant computer system of the invention via the redundant data buses;

FIG. 3 is a block diagram showing more detail of the bus comparison logic and the fault determination logic of the system of FIG. 1;

DESCRIPTION OF THE PREFERRED EMBODIMENT

Figure 1:
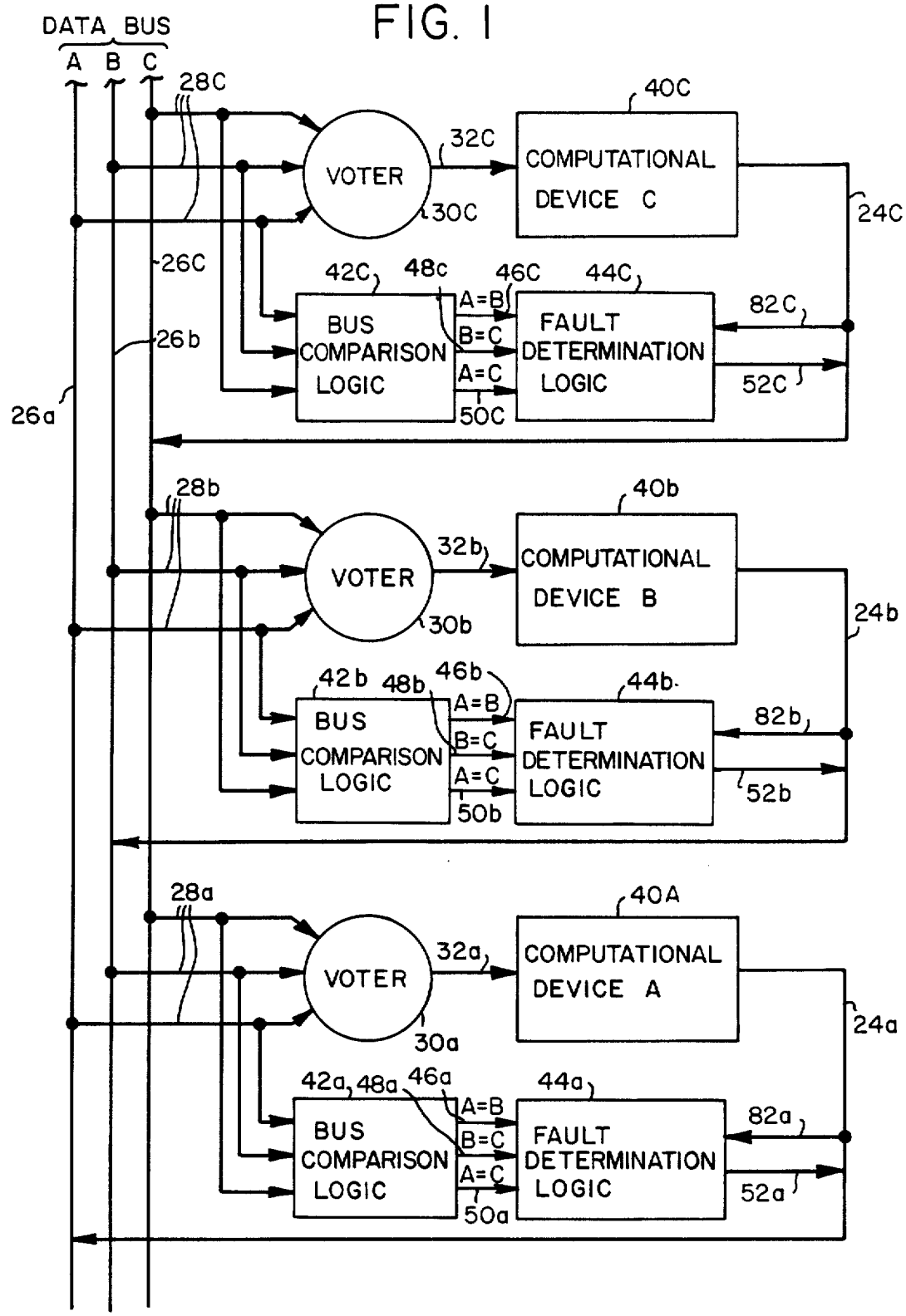
FIG. 1 is a block diagram of a triple-redundant computer system in accordance with the invention.

As shown in the drawings for purposes of illustration, the present invention is concerned with fault-tolerant computer systems of the type that employ multiple computation circuits and voting circuits to reduce the possibility of computational errors arising from a computer failure of some kind. In a typical real-time computer application, such as in the monitoring and control of process variables in a complex industrial process, a computational device receives both digital and analog input signals and generates digital and analog output signals. As shown in FIG. 2a, a typical computer system includes a processor, indicated by reference numeral 10, and an associated memory 12. The input and output signals communicate with the processor 10, as indicated at 14 and 16, and every function that the computer performs can be considered to be a direct result of manipulations of the computer memory 12.

The processor 10 communicates with its memory 12 over address lines 18, which carries a memory address, and over a data path, which, for convenience, can be considered as a data "write" path 20 over which data words are stored in the memory 12, and a data "read" path 22, over which data words are retrieved from memory. In the computer system of the invention, data items that are read from the memory of the triplicated computational devices are monitored for purposes of fault detection, and are later returned to the processor 10 in the form of majority-voted data. A typical one of the three computational devices is shown in conceptual form in FIG. 2b. Data words from the memory 12 are transmitted over line 24 to one of three data buses 26. The other two data buses receive data from the other two computational devices, and the three data buses should carry identical data at all times if all three computational devices are operating correctly and in synchronism. The only time that data on the three buses should disagree is during certain test processes, which are described later. The data buses 26 supply separate inputs over lines 28 to a voter circuit 30, which chooses the majority-voted version of the data signals from the data buses 26, and provides a single output on line 32. The processor 10 receives the voted data on line 32 and operates as if it were receiving data directly from its memory 12, although it is in fact receiving "voted data" from the memories of multiple computing systems.

The foregoing description of data flow is simplified to some extent, as will be appreciated when the hardware of the computational devices is described in more detail. The data paths to and from the memory 12 are implemented as a single bidirectional path, although it is only the read path 22 that is intercepted for processing by the voter circuit 30.

A triple-redundant computer system is shown in FIG. 1, including three computational devices 40a, 40b and 40c. Throughout this description, the subscripts a, b and c are used to identify one of three computational subsystems. If a reference numeral is used without a subscript, it is intended to refer to any of the subsystems.

The computer system also includes three voter circuits 30a, 30b and 30c, three circuits 42a, 42b and 42c containing bus comparison logic, three circuits 44a, 44b and 44c containing fault comparison logic, and three data buses 26a, 26b and 26c. Data from each computational device 40 passes over line 24 to its corresponding data bus 26. Data signals from all three buses 26 are input over lines 28a to voter circuit 30a, and over similar sets of lines 28b and 28c to the voter circuits 30b and 30c. Each voter circuit 30 has an output line 32 back to the corresponding computational device 40. In each of the three subsystems, the lines 28 from the data buses 26 are also connected as inputs to the bus comparison logic 42. This logic generates three binary output signals, on lines 46, 48 and 50, indicating how various pairings of data bus signals compare. Line 46 indicates whether A=B, that is, whether the signals on data buses 26a and 26b are equal or not. Similarly, line 48 indicates whether B=C and line 50 indicates whether A=C. As shown in the drawings, these bus comparison output signals are input directly into the fault determination logic 44.

As will be explained in more detail, the fault determination logic 44 generates a fault status word indicative of the status of the whole system. The fault status word is read from the fault determination logic 44 over line 52, and transmitted over line 24 to the corresponding data bus 26. As with other data in the system, the fault status data signals are transmitted from the data buses 26 over lines 28 and into the voter circuits 30, which generate a voted or majority version of the fault status vector. In accordance with this aspect of the invention, fault status information is read simultaneously from each fault determination logic circuit 44 by the computational devices 40, but the computational devices obtain a voted version of the fault status.

The bus comparison logic 42 produces outputs on lines 46, 48 and 50 in accordance with the possible combinations set forth in Table 1.

TABLE 1

| A = B | B = C | A = C | Condition |            |
|-------|-------|-------|-----------|------------|
| 1     | 1     | 1     | #1        | No failures |
| 1     | 1     | 0     | #2        | Comparator failure |
| 1     | 0     | 1     | #3        | Comparator failure |
| 1     | 0     | 0     | #4        | Failure in module C |
| 0     | 1     | 1     | #5        | Comparator failure |
| 0     | 1     | 0     | #6        | Failure in module A |
| 0     | 0     | 1     | #7        | Failure in module B |
| 0     | 0     | 0     | #8        | Multiple failures |

Condition #1 is the normal one in which all of the outputs A, B and C are equal. The other seven conditions represent failures of some kind. For example, if module A fails only the B=C line will be true (1) and the A=C and A=B lines will be false (0). This is shown as condition #6. Similarly, condition #7 and condition #4 represent failures of modules B and C, respectively. Conditions #2, #3 and #5 represent comparator failure because they are impossible states if the comparator logic is operating properly. For example, for condition #2 there could not be a situation in which A=B and B=C, but A≠C.

The bus comparison logic 42 is shown in FIG. 3 as including three logical comparators 60.1, 60.2 and 60.3, to which the input lines 28 from the data buses 26 are connected. Specifically, buses 26a and 26b are connected to logical comparator 60.1, buses 26b and 26c are connected to logical comparator 60.2, and buses 26a and 26c are connected comparator 60.3. The comparators 60.1, 60.2 and 60.3 produce outputs on lines 46, 48 and 50 to the fault determination logic 44, indicating whether A=B, B=C and A=C, respectively. One of the logical comparators 60 is shown in more detail in FIG. 4.

Figure 4:
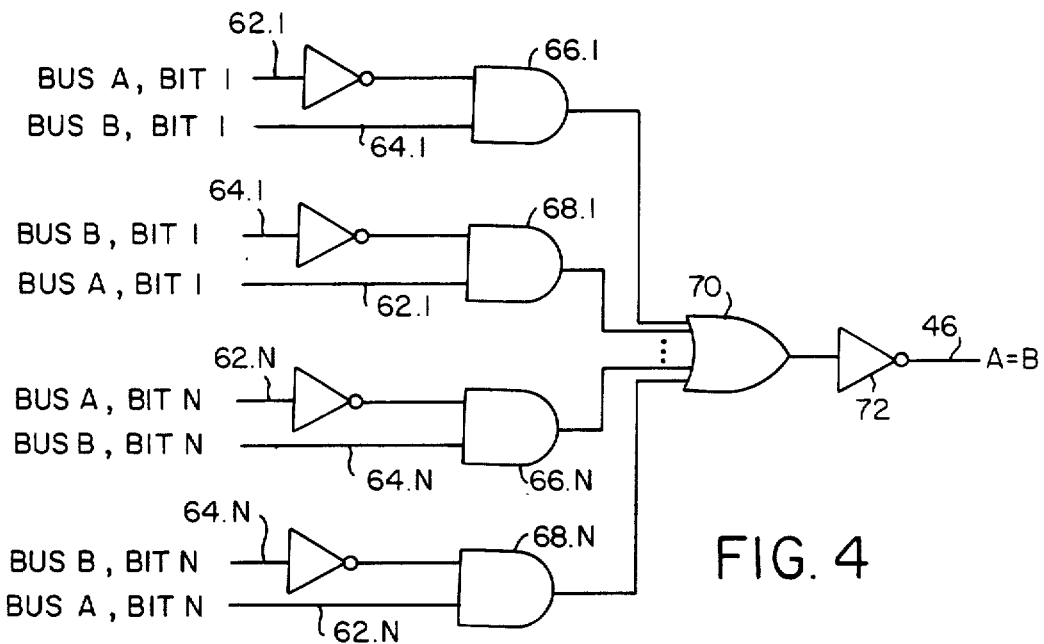
FIG. 4 is a fragmentary schematic diagram showing one of the logical comparators of FIG. 3.

It will be understood that the data buses 26 are each multi-bit buses, whereas the outputs on lines 46, 48 and 50 from the logical comparators carry single binary signals. Therefore, each logical comparator 60 has two sets of N binary inputs, where N is the number of bits in the words carried on the data buses 26. As shown in FIG. 4, for example, the comparator inputs include lines 62.1 through 62.N and 64.1 through 64.N. The comparator compares bus A, bit 1 (62.1) to bus B, bit 1 (64.1), and so on, for all bus bits through bus bit N (62.N and 64.N). One bit of the comparison is accomplished by inverting bus bit A and ANDing it with bus bit B, using AND gate 66.1, and inverting bus bit B and ANDing it with bus bit A, using AND gate 68.1. If bus bits A and B are equal, the outputs of these AND gates will be "0", the output of OR gate 70 will be "0", and the inverted output A=B will be true (logical "1"). If the bus bit A ever differs from bus bit B, then the output of either AND gate 66.1 or AND gate 68.1 will be a "1", the output of OR gate 70 will be a "1" and the A=B output will be a logical "0" (false).

It will be observed that, if the input data words from the two buses 26a and 26b are identical in every bit position, all of the AND gates 68 will produce logical "0" outputs. Therefore, the OR gate 70 will have a "0" output, and the output on line 46 will be a logical "1". However, if the input words differ in at least one bit position, at least one of the AND gates 68 will generate a logical "1" output, and this will propagate through the OR gate 70 and result in a logical "0" signal on the A=B output line 46. The other logical comparators 60.2 and 60.3 are, of course, structured in identical fashion.

The fault determination logic 44 is also shown in more detail in FIG. 3. It includes a set of three exclusive OR (XOR) gates 72.1, 72.2 and 72.3, a test register 74, a fault status register 76, and fault status logic 78. The output lines 46, 48 and 50 from the bus comparison logic 42 are connected as inputs to the three XOR gates 72.1, 72.2 and 72.3, respectively. The other inputs to the XOR gates are supplied over lines 80.1, 80.2 and 80.3 from the test register 74, which, in turn, may have data written to it from the processor 10, over line 82. If the test register is zero, the XOR gates 72 have no effect on the input signals on lines 46, 48 and 50, and the outputs of the XOR gates are applied as inputs to the fault status logic 74. The fault status logic provides outputs on line 84 to the fault status register 76, which may be read from the processor 10, as indicated by line 86. A logical "1" in any position of the test register has the effect of logically inverting the corresponding input signal to the fault determination logic 44, by means of one of the XOR gates 72. These potentially modified inputs are designated as A'=B', B'=C' and A'=C', on lines 90, 92 and 94 from the XOR gates 72.1, 72.2 and 72.3.

Figure 5:
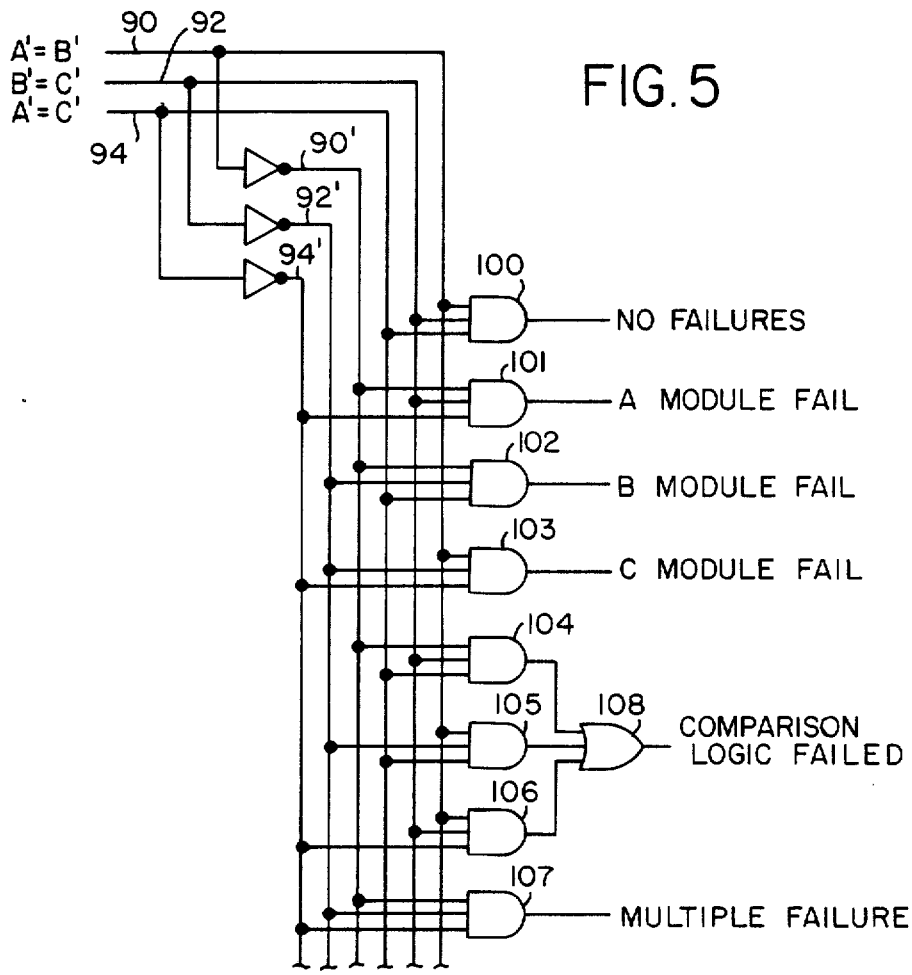
FIG. 5 is a schematic diagram showing the fault status logic of FIG. 3.

The fault status logic 78 is shown in more detail in FIG. 5, which is one possible implementation of the truth table given in Table 1. The inputs on lines 90, 92 and 94 are complemented in inverters 96, to provide a parallel set of three inverted inputs on lines 90', 92' and 94'. Outputs from the logic 78 are provided on eight AND gates 100-107 and an OR gate 108. AND gate 100 receives inputs from lines 90, 92 and 94, and provides a "1" output when there are no failures and the system is operating normally. AND gate 101 receives inputs from lines 92, 90' and 94', and provides a "1" output when the A module has failed. AND gate 102 receives inputs from lines 94, 90' and 92', and provides a "1" output when the B module has failed. AND gate 103 receives inputs from lines 90, 92' and 94', and provides a "1" output when module C has failed. AND gate 104 receives inputs from lines 92, 94 and 90', and provides a "1" output only for an impossible condition indicative of comparator failure. Similarly, AND gate 105 receives inputs from lines 90, 94 and 92' and provides a "1" output only for a comparator failure, and AND gate 106 receives inputs from lines 90, 92 and 94' and provides a "1" output only when another comparator failure occurs. The outputs from AND gates 104, 105 and 106 are ORed together in OR gate 108, to provide a single output signal indicative of comparator failure.

The final AND gate 107 receives inputs from lines 90', 92' and 94', and provides a "1" output only when there is a multiple failure, with no agreement between any two computational devices.

Figure 6:
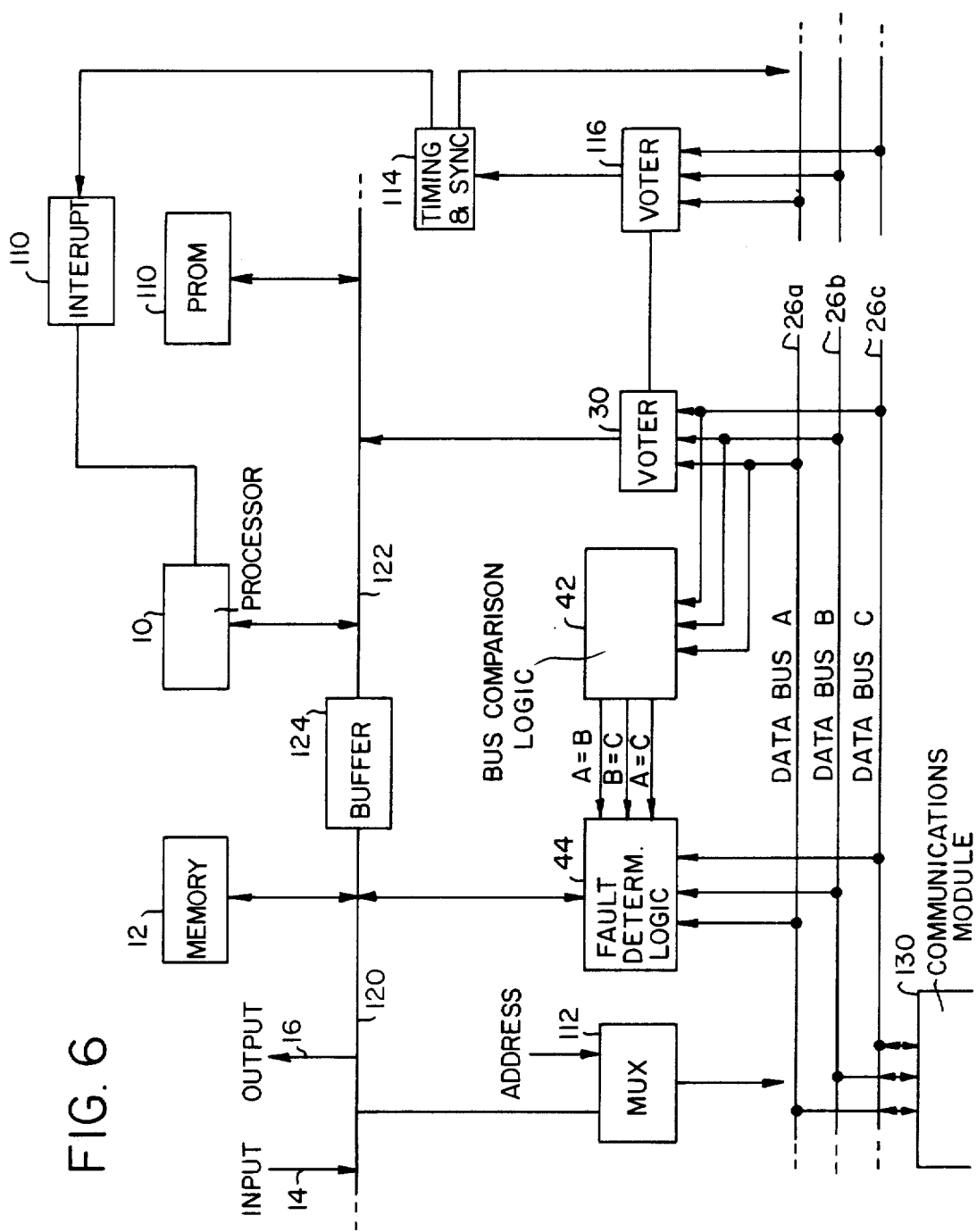
FIG. 6 is a hardware block diagram of one of the three computational subsystems shown in FIG. 1.

The six bits of output from the fault status logic 78 are stored in the fault status register 76, together with any useful items of status, and may be read by the processor during operation of the system. An important aspect of the invention is the manner in which the fault status register is read into the processor of the computational device. This is best illustrated by consideration of the data flow within the hardware block diagram of FIG. 6. The hardware within each of the three illustrative subsystems includes the processor 10, the memory 12, and an additional programmable read-only memory (PROM) unit 110, the voter circuit 30, the bus comparison logic 42, the fault determination logic 44, a multiplexer 112, timing and synchronization logic 114, a timing and synchronization signal voter circuit 116, and interrupt processing logic 118. Also included are a first internal bus 120 connected to the memory 12, to the multiplexer 112 and to the fault determination logic 44, and a second internal bus 122 connected to the voter circuit 30, to the processor 10 and to the and hardware registers 110. The two internal buses 120 and 122 are connected together through a buffer 124. Operation of the system of the invention can best be appreciated from a discussion of the various alternative data flow paths, with reference to FIG. 6.

Writing data to memory:

This is a relatively simple flow path, extending from the processor 10 to the second internal bus 122, through the buffer 124 to the first internal bus 120, and from there to the memory 12.

Reading data from memory:

This is the normal voted memory read operation. Data flows from the memory 12 to the first internal bus 120, and from there through the multiplexer 112 to one of the data buses 26. All of the data buses 26 are then read back through the voter circuit 30, the output of which is transmitted through the second internal bus 122 to the processor 10. In some situations, the processor 10 may perform a non-voted read from the memory 12. The data flow path in these cases would be from the memory 12 to the first internal bus 120, through the buffer 124 to the second internal bus 122, and from there to the processor 10.

Writing data to the test register:

The processor 10 may write data to the test register within the fault determination logic 44. The path is from the processor 10 to the second internal bus 122, through the buffer 124 to the first internal bus 120, and from there to the fault determination logic 44.

Reading data from the fault status register:

This is the important path by which voted fault status information is read by the processors 10. The path is from the fault determination logic 44 to the first internal bus 120, and from there through the multiplexer 112 and onto the corresponding data bus 26. The other two subsystems are simultaneously providing their versions of the fault status on the other two data buses 26. The voter circuit 30 reads all three fault status words from the data buses 26, and transmits its voted output through the second internal bus 122 to the processor 10. In some instances, a non-voted read from the fault status register is needed. The flow path is then from the fault determination logic 44 to the first internal bus 120, through the buffer 124 to the second internal bus 122, and then directly to the processor 10.

Data flow to/from a communications module:

The same voting principles that have been described may be applied to sending data to and receiving data from a communications module 130 coupled to the data buses 26. The communications module 130 provides an alternative means for communicating with external devices. Output signals are transmitted through the communications module and input signals are received through the module. However, instead of communicating directly with the processor 10, a path is established through the data buses 26. For data input, the communications module 130 distributes the externally derived input signals onto the three data buses 26. The input signals are then coupled from the data buses 26 to the voter circuits 30, and input to the computation devices. For output, each computation device transmits output data through the second internal bus 122, the buffer 124, the first internal bus 120, the multiplexer 112, and onto the data buses 26. The multiplexer 112 provides for the transmission of address information, as well as data, to the communication module 130. The communication module 130 receives the output data from the data buses 26, and includes its own voter circuit (not shown) to provide voted output data to a desired destination device external to the system.

The processor 10 of each subsystem is programmed to perform periodic tests on the voter circuit 30, the bus comparison logic 42 and the fault determination logic 44. A bus comparison test is conducted by placing an intentionally incorrect data word on one of the data buses 26, and checking the fault indications by reading the fault status registers. Suppose, for example, that the A subsystem has an incorrect data word on its data bus 26a. This should produce a fault status vector indicating that the A module had failed. However, if the bus comparison logic 42 in one of the subsystems has failed, this will result in an incorrect error diagnosis being made in the subsystem with the faulty comparison logic. Two of the subsystems will have a fault status register correctly indicating a fault in module A, while the third will indicate some other condition. When these registers are read back through the data buses 26, the bus comparison logic 42 in at least two of the subsystems will generate outputs that pinpoint the identity of the faulty module.

By way of example, suppose that the bus comparison logic 42 in module C has a fault that causes it to generate a logical "1" output at all times on its A=B output, regardless of input. If a fault is simulated for module A, by placing incorrect data on the data bus 26a, this will result in the following outputs from the bus comparison logic 42 in the three subsystems:

|       | Good Modules A & B | Faulty Module C |
|-------|--------------------|-----------------|
| A = B | 0                  | 1               |
| B = C | 1                  | 1               |
| A = C | 0                  | 0               |

Modules A and B produce the proper outputs from their bus comparison logic, such that only the B=C output line is a logical "1". This translates into a fault status bit indicating a module A failure. The faulty C module produces an incorrect result that translates into a fault status bit indicating "comparator error," but not carrying any indication of which comparator is in error. When a voted read operation of the fault status register 76 is used to retrieve the fault status information, the fault status vector from each subsystem is transmitted to the respective data buses 26 and read from the buses into the voter circuits 30 and into the bus comparison logic 42. The error is this time on the C bus 26c, since the buses 26a and 26b will carry a proper indication of a module-A fault, while the bus 26c will carry an indication of comparator error. This time the outputs of the bus comparison logic 42 will be as follows:

|       | Good Modules A & B | Faulty Module C |
|-------|--------------------|-----------------|
| A = B | 1                  | 1               |
| B = C | 0                  | 0               |
| A = C | 0                  | 0               |

Even the faulty C module produces the correct result, since its error condition in this example happens to be one that produces a "1" output on the A=B line. In any event, at least a majority of the modules produces an output indicative of a module C failure. This status word may then be read from the fault determination logic, and the identity of the faulty bus comparison logic is obtained.

In summary, faults in the comparison logic 42 are detected by placing an intentionally incorrect data word on one of the data buses 26 and reading the resulting fault status words from the fault determination logic. Provided no more than one bus comparison logic 42 is in error, the voted read of the fault status should indicate an error consistent with the simulated data error condition. The process of performing a voted read of the fault status register will itself produce a new condition in the fault status register. If there are no bus comparison logic faults at all, the new condition of the fault status register will indicate no errors, since all of the modules will be reading a module-A-error condition from the status register. If, however, there is a failure in the bus comparison logic or the fault determination logic of one of the modules, the new condition of the fault status register, caused by reading the first condition in the status register, will indicate an error in the module having the faulty bus comparison logic or fault determination logic. In essence, the test provides a method for checking the integrity of the fault determination logic itself.

Another routine test that can be performed periodically by the processors 10 has the effect of checking the fault determination logic. Each processor 10 sequentially writes a set of test vectors into the three-bit test register. Each test vector simulates the conditions shown in Table 1. The proper response, given in Table 1, is then expected when the fault status register is read. In normal operation, all of the output lines 46, 48 and 50 from the bus comparison logic 42 will be logical "1's", indicating no errors. To simulate a failure condition, the test register has to be loaded with the bit-complement of the desired pattern. For example, a module-A failure is indicated by the following bus comparison outputs:

| A = B | 0 |
| B = C | 1 |
| A = C | 0 |

Since the XOR gates operate to complement or invert the bus comparison output signals when a logical "1" is present in the test register, the normal pattern of output signals can be converted to a desired pattern by placing the complement of the desired pattern in the test register. In the example given, the 0-1-0 pattern can be simulated by storing the complementary pattern 1-0-1 in the test register. The other output configurations of Table 1 are simulated in a similar manner.

As in the previously described test in which a data error was simulated, this test also identifies errors in fault determination logic. For example, suppose that the test register is loaded with the pattern 1-0-1 to simulate a module-A failure. This will generate a fault status vector indicating a module-A failure in all three modules, assuming that the fault determination logic 44 is operating correctly. Suppose, however, that there is a fault in the fault determination logic of module B, resulting in a fault status other than the correct one. When the fault status words are read from the fault determination logic, the test register is temporarily cleared, and the expected majority input read from the fault status register indicates that there is a (simulated) fault in module A. This voted read process itself generates a new fault status word, this time indicating an error in module B, and thereby identifying which of the modules has an error in its fault determination logic.

One aspect of the invention that has not been discussed in depth concerns synchronization of the three modules. Clearly it is of critical importance that the three modules operate in synchronism. Synchronization involves three separate aspects: the establishment of a time base using a common clock signal, the establishment of a common real-time clock having a relatively long period, such as one millisecond, for use by the processors in the control functions they have to perform, and the synchronization of the modules during start-up or initialization.

The time base clock generator includes a phase voter circuit (not shown) in each module, connected to receive its own ten-megahertz clock output and those of the two other modules. The phase voter output controls a crystal oscillator and, in conjunction with an amplifier, generates the clock signals for the module. This arrangement provides synchronous ten-megahertz clock signals generated in each module.

The real-time clock signals are generated by means of a conventional clock divider chain for producing the slower real-time clock signals from the ten-megahertz clock signals. Again, voting principles are used to ensure that the real-time clock pulses from all three modules are synchronized.

Figure 7:
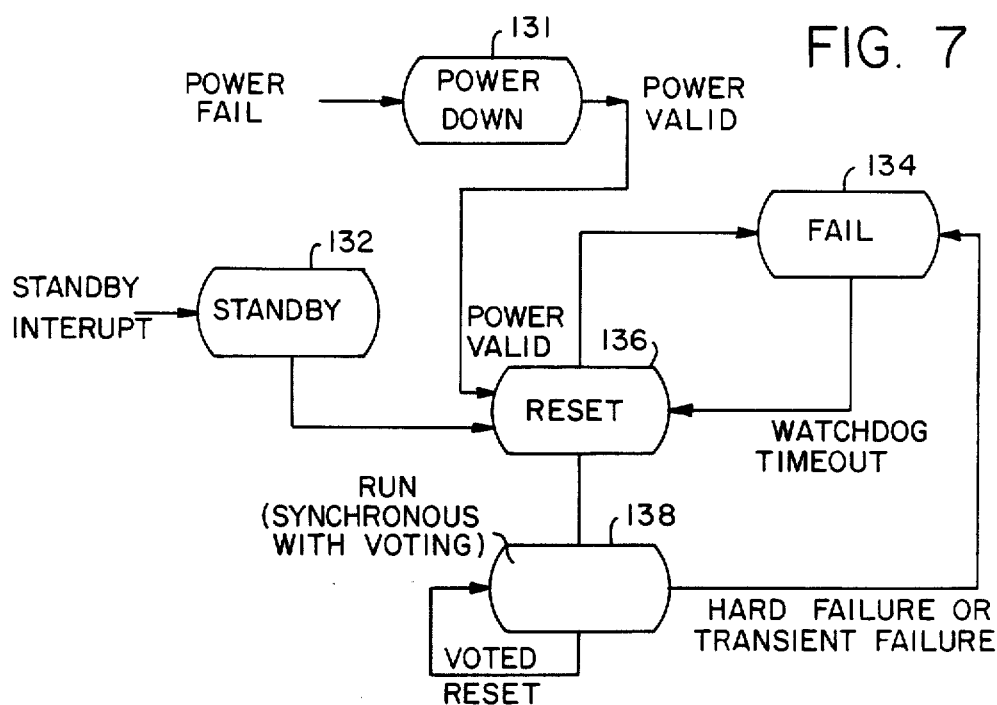
FIG. 7 is a block diagram showing various hardware states of the processor used in each computational module of the invention.

Start-up presents a special case of synchronization. The modules are initially powered up separately. FIG. 7 shows the various hardware states of the processor 10, including the power-down state 131, a standby state 132, a fail state 134, a reset state 136 and a run state 138. The power-down state is entered when any of the power supply voltages becomes invalid. Upon restoration of power, the processor makes a transition to the reset state 136. In the reset state 136, the processor executes software asynchronously with the other modules, but is not permitted to perform data voting. The processor requests permission to enter the run state 13s by issuing a "reset request." A reset request from only one module has no effect, but if another processor also issues a reset request, this is designated a "voted reset," which is issued to all of the processors together. The effect of the voted reset is to interrupt all of the processors and to hold them until an interrupt acknowledgment is received from all of them, at which time the processors are released, to enter the run state 138 simultaneously. In the run state, the processors are fully synchronized and perform data voting.

The fail state is entered upon the occurrence of a hard failure or a transient failure causing the processor to lose synchronization and execute invalid data. The failed module will automatically attempt to enter the reset state in an attempt to clear the failure, but will reenter the fail state if the failure persists.

The standby state is entered upon the occurrence of a standby interrupt, providing an early warning of some significant event, such as power failure, module removal, or lack of a voting majority. The standby state is a transitory one, used for events. Upon termination of the standby processing, there is a transition to the reset state.

An important aspect of the invention is its ability to allow module replacement without powering down the entire system. In other words, the system of the invention permits "hot" removal and replacement of modules, where each module includes a computational device, a voting circuit 30, bus comparison logic 42 and fault determination logic 44. If any of the modules fails, and its failure is detected in the manner already described, ideally the faulty module should be removed and replaced without loss of integrity of the data that the system is outputting and without interruption of any external process that the system is controlling. Unfortunately, the removal and replacement of a module while the power is still applied to the system presents a number of significant problems. Specifically, the system is prone to errors caused by spurious signals generated during module removal and replacement.

Figure 8:
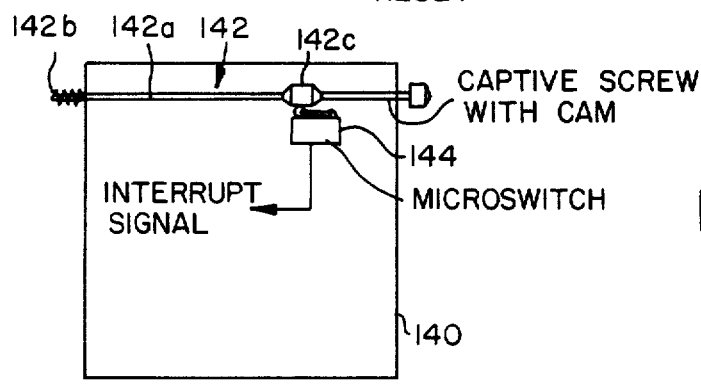
FIG. 8 is a simplified elevational view showing a mechanical interlock used to generated an electrical interrupt during removal or replacement of a module.

Two mechanisms are employed to protect the system from improper operation or spurious signals during removal and replacement. As shown in FIG. 8, each module, indicated at 140, is secured in its operational position by means of an electromechanical interlock, consisting of a captive screw fastener 142. The fastener 142 has a long shaft 142a terminating in a screw thread 142b, and a mid-portion 142c with an enlarged diameter, which serves as a cam. When the screw fastener is in its secured position, the cam portion 142c places a microswitch 144 in one of its two conditions. When the screw fastener 142 is removed, the switch 144 is cammed into its other condition, and generates an interrupt signal to the processor. The interrupt signal is used to terminate operations of the microprocessor before the module is actually removed from the system. By this means, the module about to be removed is prevented from performing any spurious operations during the removal step.

Figure 9:
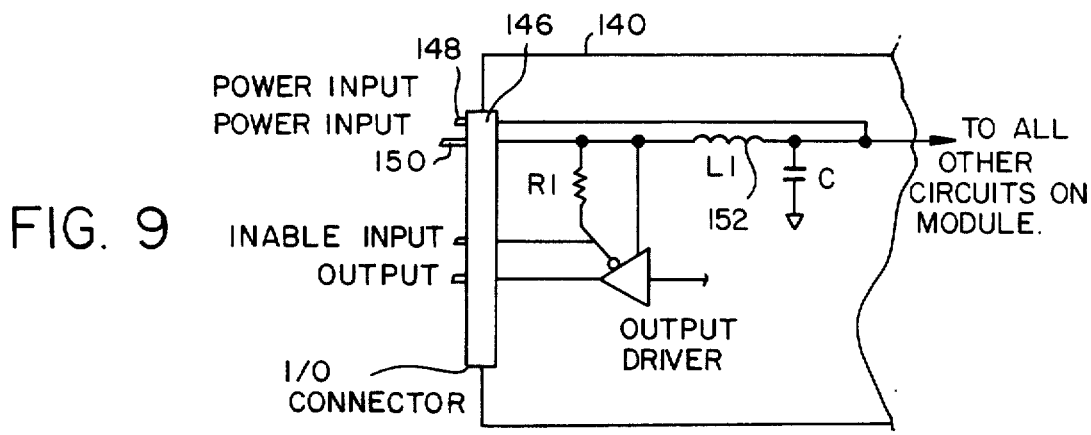
FIG. 9 is a diagram showing how a module is constructed to permit "hot" removal and replacement.

In order to maintain the proper state of the circuits within a module during insertion and removal, dc power supplied to the circuits must be maintained while the removal or replacement step is taking place. A second mechanism, shown in FIG. 9, is used for this purpose. The module 140 includes an input/output (I/O) connector 146, which has a conventional power input pin 148 and a second power input pin 150 of extended length. The longer pin 150 ensures that the power connection is the first that is made when the module is installed in the system, and is the last to be broken when the module is removed. Power applied through the longer pin 150 is connected through an internal series inductor or series resistor 152, to eliminate any instantaneous power surges that might otherwise occur. The circuits charge slowly due to the current-limiting effect of the inductor or resistor 152, and when the shorter pin 148 makes contact the inductor or resistor is bypassed automatically.

The process of module replacement is not completed, of course, until the replacement module is fully synchronized with the other modules already in operation. After a new module is plugged in and powered up, synchronization occurs in a manner analogous to the start-up procedure described earlier. However, the procedure is not quite the same, since not all three modules are starting up at the same time. The new module in this case initially has no programs or data stored in its memory. Once the new module has established time base and real-time synchronization with the other two modules, it posts a "reset request" and waits for the two operating modules to post their own "reset requests." Modules operating in the run state 138 periodically post a "reset request" to provide a window or time slot for a new module to enter the run state 138. Upon receiving a "voted reset" the new module enters the run state 138 and operates in conjuction with the other two modules, using their voted data to determine proper program execution. Since the new module initially has nothing in its memory, it will not generate correct data and will be out-voted by the other two modules. It still remains to load the memory of the new module to conform with the memories of the other modules.

This process is performed as a "background" task by all of the modules. The background task, which is executed in addition to other processing performed by the operational modules, reads memory locations and re-writes the contents back into memory. The software for performing these reads and writes is executed by all three modules in unison, using the voting circuits 30. In this manner, the contents of the "good" memories of the operational modules are copied into the memory of the new module. Once the entire memory of the new module has been restored, the new module is able to vote in conformance with the other modules, until such time as an error is detected by the fault determination logic that has been described.

Figure 10:
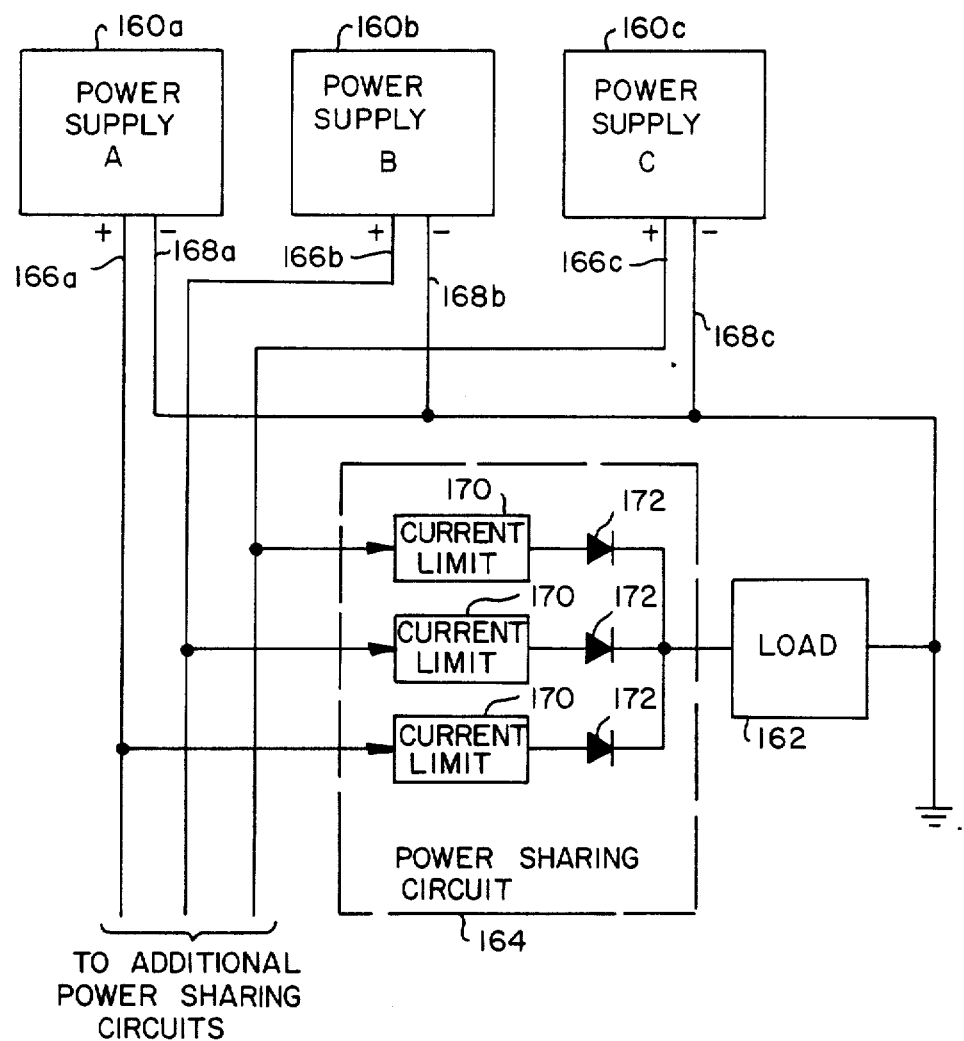
FIG. 10 is simplified block diagram of a power sharing circuit for use in conjunction with the triple-redundant computer system of the invention.

FIG. 10 is a block diagram of a power sharing circuit that can be advantageously used with the system of the invention, to continue to supply power to its load even when one of a number of power supplies fails. In accordance with this aspect of the invention, power is supplied to electrical loads in various functional units in the system from three separate power supplies 160a, 160b and 160c, over a set of redundant power supply buses. Each electrical load in the system, one of which is represented as block 162, is supplied with power through a power sharing circuit 164. There may be several loads and corresponding power sharing circuits connected to one set of redundant power buses.

Each power supply 160 has a positive voltage output line 166a, 166b, 166c, which together form a power supply bus, and a negative voltage output line 168a, 168b and 168c. The negative output voltage lines 168 are connected in common to ground, and one side of the load 162 is also grounded. The positive output voltage lines 166 are each connected to all of the power sharing circuits 164, only one of which is shown in the figure.

The power sharing circuit includes three current limit circuits 170 and three diodes 172. Each of the power supply lines 166 is connected in series through a current limit circuit 170 and a diode 172. The negative or cathode terminals of the diodes 172 are connected in common to the load 162.

Current flows from the power supply bus 166 through the current limit circuits 170, and through the diodes 172 to the load 162. The currents from the power supplies 160 are combined in an additive manner at the load 162. If any power supply fails in such a way that it no longer delivers current, the remaining functioning power supplies provide the additional current needed to maintain the load current constant. Furthermore, if any power supply or power bus develops a short-circuit between its positive and negative voltage terminals, this will not adversely affect operation of the system, since current will continue to be provide by the other power supplies, and the diodes 172 prevent reverse flow of power from the properly operating supplies into the short-circuit condition. Therefore, the remaining good power supplies will not experience any additional load. Finally, if the load fails in such a way that it would draw excessive current from the power supply system, the total current delivered will be limited by the current limit circuits 170. This prevents a failure in one load circuit from loading up the entire power system to the point where failure would occur and other loads would be deprived of power.

It will be appreciated from the foregoing that the present invention represents a significant advance in the field of fault-tolerant computer systems. In particular, the invention provides a multiple-redundant computer system that not only detects faults in multiple computational devices, but also detects faults in the fault determination logic. The system of the invention also includes means for removing and replacing defective modules without shutting down the entire system. Although one embodiment of the invention has been described in detail for purposes of illustration, various modifications may be made without departing from the spirit and scope of the invention. Accordingly, the invention is not to be limited except as by the appended claims.

We claim:

1. A multiple-redundant computer system, comprising:

a plurality of synchronized computational devices, each of which has a processor and a memory, and a data path between its processor and its memory;

an equal plurality of data buses associated one with each of the computational devices;

means in each computational device for intercepting data on the data path between the memory and its associated processor, and transmitting the intercepted data to the data bus associated with the computational device;

an equal plurality of voter circuits associated one with each of the computational devices and each connected to receive inputs from all of the plurality of data buses and to supply a single voted output to its associated computational device;

an equal plurality of fault determination logic circuits associated one with each of the computational devices, and each connected to receive inputs from all of the plurality of data buses and to each generate a fault status word indicative of any fault conditions in the system; and means associated with each computational device, for periodically reading the fault status word from the fault determination logic onto the associated data bus and through the associated voter circuit to the associated computational device, wherein each of the computational devices is periodically supplied with a voted fault status word indicative of any fault conditions in the system as determined by a majority of the fault determination logic circuits.

2. A computer system as defined in claim 1, wherein:
the number of computational devices is three.

3. A computer system as defined in claim 1, wherein:
the system has an electrical load that is divided into a plurality (N) of loads;
the system further includes a plurality of (M) of separate power supplies and a plurality of power sharing circuits, for coupling all of the power supplies to each of the loads in such a manner that each load can receive power from any selected combination of the power supplies.

4. A computer system as defined in claim 3, wherein each of the power sharing circuits includes:
a plurality (M) of current limit circuits, connected one in each power supply line to limit the current supplied by any of the power supplies in the event of a short circuit in a load; and a plurality of (M) of diodes connected one in each power supply line to prevent flow of current from one power supply to another.

5. A computer system as defined in claim 1, wherein each fault determination logic circuit includes:
bus comparison logic connected to receive signals from the data buses and to generate bus comparison output signals indicative of whether or not there is agreement as to data values carried by the plurality of data buses;
fault status logic, including means for interpreting the bus comparison output signals from the bus comparison logic, and generating therefrom the fault status word for each computational device.

6. A computer system as defined in claim 5, wherein: the number of computational devices is three.

7. A computer system as defined in claim 5, wherein: the fault status logic in each fault determination logic circuit also includes a test register addressable by the associated computational device and coupled to the fault determination logic circuit, and means for selectively setting the bus comparison output signals, to facilitate the detection of faults in the fault determination logic.

8. A computer system as defined in claim 7, wherein: the number of computational devices is three.

9. A triple-redundant computer system, comprising:
three synchronized computational devices, each of which has a processor and a memory, and a data path between its processor and its memory;
three data buses associated one with each of the computational devices;
means for intercepting data on the data path between the memory and the processor, and transmitting it to be corresponding data bus;
three voter circuits associated one with each of the computational devices and connected to receive inputs from all three of the data buses and to supply a single voted output to its computational device;
three bus comparison logic circuits, each connected to the three data buses and providing three bus comparison output signals indicative of the agreement or lack of agreement between each possible pairing of data bus signals;
three fault determination logic circuits associated one with each of the computational devices, each connected to receive as inputs the bus comparison signals from its associated bus comparison logic circuit, and each operative to generate a fault status word indicative of any fault conditions in the system; and
means associated with each computational device, for periodically reading the fault status word from the fault determination logic onto the associated data bus and through the associated voter circuit to the associated computational device, wherein each of the computational devices is periodically supplied with a voted fault status word indicative of any fault conditions in the system as determined by a majority of the fault determination logic circuits.

10. A computer system as defined in claim 9, wherein: each fault determination logic circuit also includes a test register addressable by its associated computational device and coupled to the fault determination logic circuit, and means for selectively setting the bus comparison output signals, to facilitate the detection of faults in the fault determination logic.

11. A computer system as defined in claim 10, wherein:
the system is constructed to include three modules, each including a computational device, bus comparison logic and fault determination logic; and
each module further includes means permitting removal and replacement of the module without disconnection of power from the entire system.

12. A computer system as defined in claim 11, wherein:
the means permitting removal and replacement of a module includes an extended-length power connector pin to ensure connection of power before other connections during insertion of the module, and to ensure disconnection of power after disconnection of other lines during removal of the module.

13. A computer system as defined in claim 11, wherein:
the means permitting removal and replacement of the module includes an electromechanical interlock for generating an electrical interrupt signal prior to actual removal of the module, whereby the interrupt signal may be employed to terminate operations of the module in an orderly manner.

14. A computer system as defined in claim 9, wherein:
the system has an electrical load that is divided into a plurality (N) of loads;
the system further includes a plurality (M) of separate power supplies and a plurality of power sharing circuits, for coupling all of the power supplies to each of the loads in such a manner that each load can receive power from any or all of the power supplies.

15. A computer system as defined in claim 14, wherein each of the power sharing circuits includes:
a plurality (M) of current limit circuits, connected one in each power supply line to limit the current supplied by any of the power supplies in the event of a short circuit in a load; and
a plurality (M) of diodes connected one in each power supply line to prevent flow of current from one power supply to another.

16. A computer system as defined in claim 15, wherein:
the number of power supplies is three (M=3); and
each power sharing circuit has three current limit circuits, connected to the three respective power supplies, and three diodes connected in series with the respective current limit circuits, the diodes being connected in common to one of the electrical loads.

17. A method for detecting errors in fault determination logic in a triple-redundant computer system, comprising the steps of:
simulating an error condition in one of three synchronized computational subsystems;
generating a resultant set of first fault status conditions in fault determination logic associated with each of the three subsystems;
reading the first fault status conditions onto three associated data buses and thence by majority vote into each of the three computational systems; and
generating a second fault status condition in the fault determination logic as a result of reading the first fault status conditions, the second fault status condition providing the identity of any improperly operating fault determination logic.

18. A method as defined in claim 17, wherein:
the step of simulating a fault condition includes writing onto a selected one of the data buses an intentionally incorrect data word, whereby the bus comparison of the data buses should generate an indication of error in the computational subsystem associated with the selected bus, and the step of reading the first fault status condition will reveal any improperly operating fault determination logic.

19. A method as defined in claim 17, wherein:
the step of simulating a fault condition includes injecting a selected set of bus comparison signals into the fault determination logic, whereby the step of reading the first fault status conditions reads the result expected from the bus comparison signals, and the step of reading the first fault status conditions generates second fault status conditions indicative of any errors in the fault determination logic.

20. Apparatus for detecting errors in fault determination logic in a triple-redundant computer system, the apparatus comprising:
means for simulating an error condition in one of three synchronized computational subsystems;
means for generating a resultant set of first fault status conditions in fault determination logic associated with each of the three subsystems;
means for reading the first fault status conditions onto three associated data buses and thence by majority vote into each of the three computational systems; and
means for generating a second fault status condition in the fault determination logic as a result of reading the first fault status conditions, the second fault status condition providing the identity of any improperly operating fault determination logic.

* * * * *